May 13, 1941. H. B. DRAPEAU 2,241,902
THERMOSTAT
Filed Dec. 23, 1936
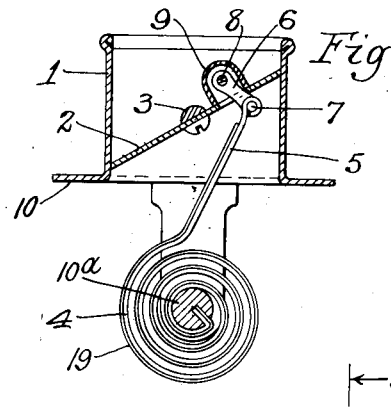
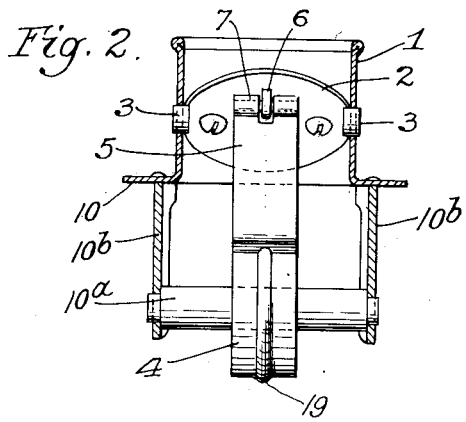
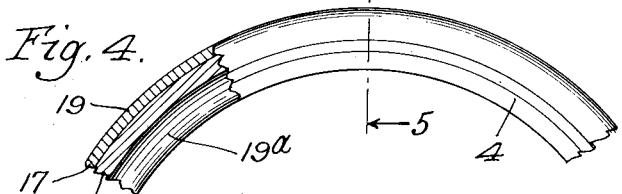
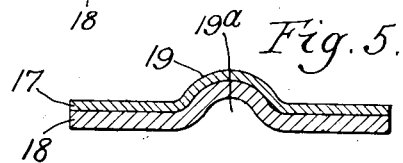
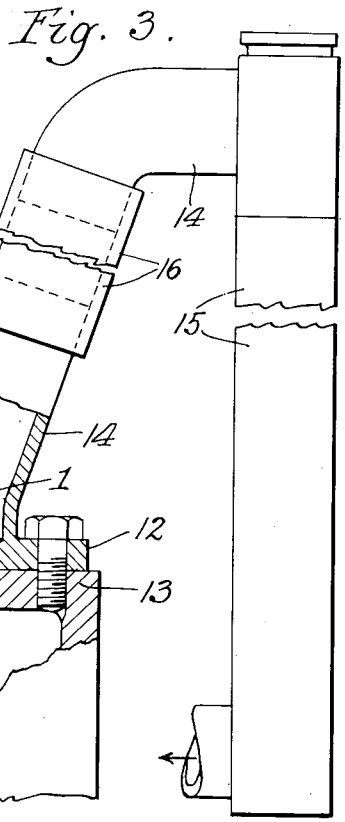
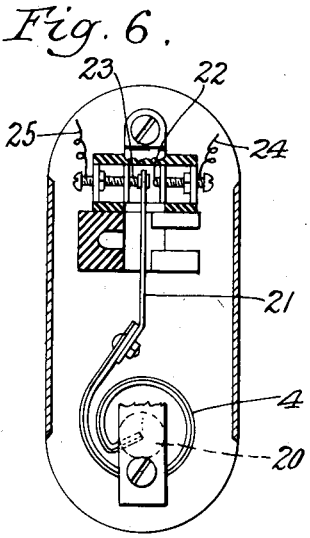
Inventor
Harold B. Drapeau
by Parker & Carter
Attorneys.

Patented May 13, 1941

2,241,902

UNITED STATES PATENT OFFICE 2,241,902

THERMOSTAT

Harold B. Drapeau, Chicago, Ill., assignor to The Dole Valve Company, Chicago, Ill., a corporation of Illinois Application December 23, 1936, Serial No. 117,348

4 Claims. (Cl. 297—15)

This invention relates to thermostats and has for its object to provide a new and improved device of this description. The invention has as a further object to provide a thermostat using thermostatic metal and in which the amount of metal used to secure a given result is reduced. The invention has as a further object to provide a thermostat which is used to do work and which is so constructed that the amount of work which can be done by the thermostat, having any given amount of thermostatic metal, is increased. The invention has as a further object the changing of the distribution of the metal of the bimetal element about a given plane, to increase its capacity to do work. The invention has as a further object to so distribute the metal of the bimetal element about its axis, that is a line running longitudinally through the longitudinal center plane of the metal, so as to increase the moment of inertia, thereby reducing the amount of the bimetal required to accomplished any given result.

In the manufacture of bimetal for thermostatic uses, the rolling mill practice does not permit the rolling of this metal to uniform thickness throughout its length, so that there is a variation in the thickness of the bimetal at different points along its length. This variation in thickness may range from five to ten percent of the total thickness of the strip. These strips of thermostatic bimetal, therefore, as now made, do not have a uniform rigidity. One of the objects of the present invention is to provide a thermostatic bimetal strip which will maintain a higher uniformity of rigidity.

The invention has further objects which are more particularly pointed out in the accompanying description.

Referring now to the drawing, Fig. 1 is a sectional view through one form of thermostatic device embodying the invention;

Fig. 2 is a view of Fig. 1, taken at right angles thereto;

Fig. 3 is a view showing the thermostatic device as used in connection with the cooling system of an automotive vehicle;

Fig. 4 is an enlarged view of a portion of the thermostatic bimetal, in part section;

Fig. 5 is a sectional view taken on line 5—5 of Fig. 4;

Fig. 6 is a view of a modified construction where the thermostatic device is used in connection with an electric circuit;

Fig. 7 is a view showing a modified construction.

Like numerals refer to like parts throughout the several figures.

In the drawing I have set out certain forms and uses of the thermostat, but it is of course evident that the invention may be embodied in any other suitable form and may be given any other desired use. I have also illustrated several different forms of the strip of thermostatic bimetal, deformed in different ways to increase the magnitude of its moment of inertia, thereby increasing the work a given amount of thermostatic metal can do, or decreasing the amount of thermostatic metal required to do any given amount of work, and have simply illustrated several different way of deforming the metal, but it is of course evident that it may be deformed in various other ways without departing from the spirit of the invention.

Referring to the construction illustrated in Figs. 1 to 5, there is shown one form of device particularly adapted to be used in connection with the cooling system of an internal combustion engine as used in automotive vehicles. In this construction there is a casing 1 which has pivotally mounted therein a valve 2 which, when in its closed position, closes the passageway through the casing, the valve being pivoted at 3. A strip of thermostatic metal 4 has one end 5 connected with the valve 2 in any desired manner, so as to move this valve to its open position when the temperature of the cooling liquid rises above a predetermined point. This connection between the strip of thermostatic metal and the valve is shown as being made by the link 6 which is pivoted at 7 to the end of the thermostatic strip and at 8 to the valve. In this particular construction, the valve is provided with a housing 9 for this pivot. The casing 1 is provided with the laterally extending wall 10. In this construction the thermostatic strip is formed in a coil and the other end is connected with a fixed part 10a which is supported by the projecting arms 10b, connected with the casing 1.

In Fig. 3 the casing 1 is shown as being located in the circulatory cooling system of an internal combustion engine 11. In this view the wall 10 is clamped between the member 12 and the part 13 of the engine. Connected with the member 12 is a pipe 14 which connects with the radiator 15. The pipe 14 is preferably made in two sections connected together by the connecting member 16, which may be a hose section.

The thermostatic strip is made up of two pieces of metal 17 and 18 of any of the usual metals used for this purpose, such as a ferrous and a non-ferrous metal. The bimetal strip is deformed to provide a rib 19 extending longitudinally therealong, preferably near the middle thereof. This rib may be formed in any desired manner, but I prefer to form it with curved faces. One of the simplest ways of forming it is to bend the strip intermediate its edges so that bent portions project beyond the face of the adjacent portions thereof. When this is done there is provided a groove 19a on one side of the metal and a rib on the other side.

I have found that this rib maintains a higher uniformity of rigidity along the length of the strip when there are variations in the thickness of the strip, as occurs in the usual method of manufacturing the strip. This construction also permits a lesser amount of thermostatic metal to be used to secure any given result. This construction also provides a thermostat wherein the amount of work that can be done by the thermostat, having any given amount of thermostatic metal, is increased. In Fig. 1, for example, the thermostatic device is shown as connected with a valve in the circulatory system of an internal combustion engine. For a quick warm-up, it is essential that the rigidity of the thermostatic coil be sufficient to hold the valve in the heat-on position during the warm-up period. This construction permits this to be done with much less metal than with the ordinary flat bimetal elements.

In Fig. 6 there is illustrated a construction where the strip of thermostatic metal 4 is connected at one end to a fixed part 20 and is provided with a contact member 21 which works between the electric contacts 22 and 23 which are connected by the wires 24 and 25 in any suitable circuit, so that the thermostat is used to make and break the circuit.

This construction not only provides a thermostatic strip having a higher uniformity of rigidity along its entire length, but it reduces the cost of the thermostat by reducing the amount of bimetal necessary to secure a given result.

In Figs. 4 and 5 I have illustrated a simple and effective means of deforming a strip of bimetal so as to increase the magnitude of its moment of inertia. It is of course evident that this strip may be deformed in various other ways to secure this result, so as to thereby increase the amount of work any given amount of thermostatic metal can accomplish, or reduce the amount of thermostatic metal required for any given purpose.

In Fig. 7 there is illustrated a modified construction wherein the two metal elements 17 and 18 of the bimetal are left in their original form and there is attached to one of them, extending longitudinally therealong, a metal member 26 which may be brazed, soldered or otherwise fastened in position.

I claim:

1. A bimetal thermostatic element to be used in a thermostatic device, comprising two pieces of metal, having different coefficients of expansion, connected together; and provided with a longitudinally extending rib, said rib formed by bending a portion of both of the bimetal strips between their edges so as to cause the metal of one piece to project into the plane of the main body portion of the other piece.

2. A bimetal thermostatic element to be used in a thermostatic device, comprising two pieces of metal, having different coefficients of expansion, connected together, and a longitudinally extending rib on each of said pieces, said rib having a curved outer face.

3. A bimetal thermostatic element to be used in a thermostatic device, comprising two pieces of metal, having different coefficients of expansion, connected together, a projecting rib on one side thereof, and an opposed groove on the other side thereof, the projecting rib formed on one of the pieces of the bimetal element and the groove formed in the other bimetal element.

4. A bimetal thermostatic element to be used in a thermostatic device, comprising two pieces of metal, having different coefficients of expansion, connected together to form a strip, the strip made up of the two pieces being deformed near its middle, whereby a more uniform rigidity of the strip is secured.

HAROLD B. DRAPEAU.